(12) United States Patent
Matsumoto et al.

(10) Patent No.: US 7,407,441 B2
(45) Date of Patent: Aug. 5, 2008

(54) CONSTANT VELOCITY JOINT

(75) Inventors: Takumi Matsumoto, Nishikamo-gun (JP); Takashi Matsuda, Toyota (JP); Tetsuo Nimura, Toyoake (JP); Kouichi Matsuura, Higashikamo-gun (JP); Satoshi Suzuki, Handa (JP); Shinji Nakai, Nagoya (JP)

(73) Assignees: Toyota Jidosha Kabushiki Kaisha, Toyota-shi (JP); JTEKT Corporation, Osaka (JP)

( * ) Notice: Subject to any disclaimer, the term of this patent is extended or adjusted under 35 U.S.C. 154(b) by 237 days.

(21) Appl. No.: 10/498,983

(22) PCT Filed: Nov. 25, 2002

(86) PCT No.: PCT/IB02/04913

§ 371 (c)(1),
(2), (4) Date: Oct. 5, 2004

(87) PCT Pub. No.: WO03/056198

PCT Pub. Date: Jul. 10, 2003

(65) Prior Publication Data

US 2005/0070364 A1 Mar. 31, 2005

(30) Foreign Application Priority Data

Dec. 25, 2001 (JP) .............................. 2001-392477

(51) Int. Cl.
*F16D 3/224* (2006.01)
(52) U.S. Cl. ...................................... 464/145; 464/906
(58) Field of Classification Search .................. 464/145, 464/146, 906, 140
See application file for complete search history.

(56) References Cited

U.S. PATENT DOCUMENTS

| 4,319,465 | A | | 3/1982 | Ito et al. |
| 4,610,643 | A | * | 9/1986 | Krude .......................... 464/906 |
| 5,692,960 | A | * | 12/1997 | Sugiyama et al. ............ 464/145 |
| 6,319,133 | B1 | | 11/2001 | John et al. |
| 6,431,988 | B1 | * | 8/2002 | Tone |
| 6,557,257 | B2 | * | 5/2003 | Johnson et al. ......... 29/898.066 |
| 6,796,906 | B2 | * | 9/2004 | Cermak ....................... 464/145 |
| 2002/0065138 | A1 | * | 5/2002 | Johnson et al. ............. 464/145 |
| 2002/0077186 | A1 | * | 6/2002 | Hosoya et al. .............. 464/145 |

FOREIGN PATENT DOCUMENTS

DE 198 08 029 12/1999

(Continued)

*Primary Examiner*—Greg Binda
(74) *Attorney, Agent, or Firm*—Oblon, Spivak, McClelland, Maier & Neustadt, P.C.

(57) ABSTRACT

A constant velocity joint includes an outer race having a plurality of ball grooves formed in an inner spherical surface thereof, which ball grooves extend in a direction of a rotation axis of the outer race, an inner once having a plurality of ball grooves formed in an outer spherical surface thereof, which ball grooves extend in a direction of a rotation axis of the inner race and are paired with the ball grooves of the outer race, and a plurality of balls disposed between the ball grooves of the outer race and the ball grooves of the inner race. In the constant velicity joint, the ball grooves of at least one of the outer race and the inner race are partially formed with relief profiles to provide a plurality of relief groove portions such that a load applied to each of the balls located in the relief groove portions during torque transmission between the inner race and the outer race is smaller than a load applied to each of the balls located in the other portions of the ball grooves.

36 Claims, 8 Drawing Sheets

FOREIGN PATENT DOCUMENTS

| | | |
|---|---|---|
| FR | 2 797 924 | 3/2001 |
| FR | 2 798 709 | 3/2001 |
| JP | 58-214019 | 12/1983 |
| JP | 07-317791 | 12/1995 |
| JP | 2000-104749 | 4/2000 |
| JP | 2001153149 | * 8/2001 |

* cited by examiner

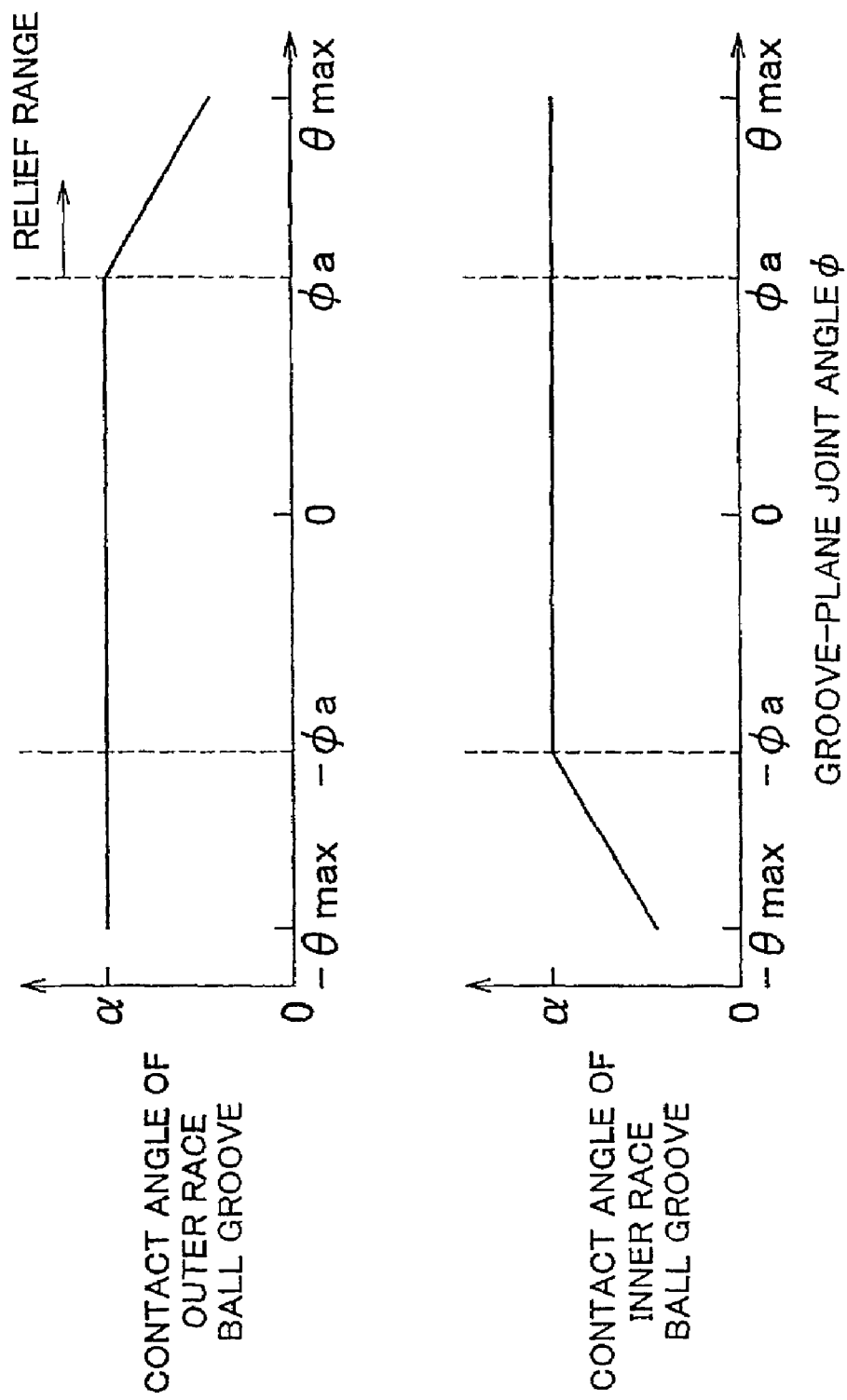

CONSTANT VELOCITY JOINT

BACKGROUND OF THE INVENTION

1. Field of the Invention

The invention generally relates to a constant velocity joint, and more particularly to a ball-type constant velocity joint having a plurality of balls captured between an inner race and an outer race of the joint.

2. Description of Related Art

In front-wheel drive vehicles and four-wheel drive vehicles, for example, constant velocity joints are generally used in coupling portions between front wheels serving as steering/driving wheels and drive shafts. Such a constant velocity joint allows changes in the joint angle between a driving shaft and a driven shaft connected to the joint, while permitting the driving shaft and the driven shaft to rotate at an equal angular velocity. As one type of the constant velocity joints, a ball-type constant velocity joint is known in which a plurality of balls are captured between an inner race and an outer race of the joint such that torque is transmitted through contact points of the balls with inner walls of grooves formed in the inner and outer races.

The inner race of the ball-type constant velocity joint has an outer spherical surface of a generally spherical shape, and is accommodated in the outer race having an inner spherical surface of a generally spherical shape. In the constant velocity joint, ball grooves extending in the direction of the rotation axis of the joint are formed in the outer spherical surface of the inner race and the inner spherical surface of the outer race at equal intervals in the circumferential direction. The number of the ball grooves formed in each of the inner and outer races is the same as that of the balls. The balls are respectively disposed between the opposed ball grooves of the inner race and the outer race, such that the intervals between the balls as measured in the circumferential direction are fixed or maintained by a cage that is interposed between the outer circumferential surface of the inner race and the inner circumferential surface of the outer race.

With the ball-type constant velocity joint thus constructed, the angle between the rotation axis of the outer race and the rotation axis of the inner race can freely change through movements of the balls along the ball grooves. On the other hand, the displacement of the balls in the circumferential direction is restrained or inhibited by side walls of the ball grooves in the outer spherical surface of the inner race and the inner spherical surface of the outer race, so that relative rotation of the inner race and the outer race is inhibited. With this arrangement, the inner race and the outer race are able to rotate at an equal angular velocity, while permitting changes in the joint angle between the inner and outer races.

As one type of the ball-type constant velocity joint as described above, a so-called UF (undercut free) type constant velocity joint is known in which ball grooves in an open end portion of the outer race are shaped in the form of straight grooves that extend in parallel with the rotation axis of the outer race.

In the UF-type constant velocity joint, the outer race can be formed with its opening having an increased inside diameter without increasing the outside diameter of the outer race. With the outer race thus formed, the joint angle is less likely to be restricted or limited by interference between a shaft connected to the inner race and the inner edge of the open end portion of the outer race, and the joint angle can be accordingly increased.

Japanese Laid-open Patent Publication No. 2001-153149 discloses another example of the UF type constant velocity joint in which the maximum joint angle can be further increased by forming the straight grooves of the outer race so that each groove extends straight in such a direction that the distance between the bottom of the groove and the rotation axis of the outer race increases toward the open end thereof.

However, the known UF-type constant velocity joints may suffer from the following problems caused by the increase in the maximum joint angle.

The outer spherical surface of the inner race and the inner spherical surface of the outer race are formed in substantially uniform arcuate shape as viewed in a plane that contains the rotation axes thereof. If the ball grooves are formed to extend substantially straight in the outer race, the depth of the ball grooves cannot be made constant, and some portions of the ball grooves inevitably have a reduced depth.

Also, the displacement of the balls in the radial directions during rotation of the joint increases as the maximum joint angle increases, and therefore the outside diameter of the cage holding the balls tends to be increased. The increase in the cage diameter requires the inner spherical surface of the outer race to be enlarged, resulting in a reduction in the groove depth of the ball grooves of the outer race as a whole.

In the constant velocity joint as described above, torque is transmitted between the outer race and the inner race via the respective balls to which a load or torque is distributed. It is thus difficult to ensure sufficiently high durability at portions of the outer race in which the ball grooves have a relatively small depth as described above. To ensure sufficiently high durability at these portions, the depth of the overall ball grooves needs to be increased, and the ball diameter also needs to be increased. The increases in the groove depth and ball diameter inevitably result in increases in the size and weight of the constant velocity joint.

The constant-velocity joint as disclosed in the above-identified publication is likely to suffer from the above-described tendencies because of the configuration of the ball grooves.

SUMMARY OF THE INVENTION

It is therefore an object of the invention to provide a constant velocity joint having an improved durability without increasing the size or weight thereof.

To accomplish the above and/or further object(s), there is provided according to one aspect of the invention a constant velocity joint including (a) an outer race having a plurality of ball grooves formed in an inner spherical surface thereof, the ball grooves extending in a direction of a rotation axis of the outer race, (b) an inner race having a plurality of ball grooves formed in an outer spherical surface thereof, the ball grooves extending in a direction of a rotation axis of the inner race and being paired with the ball grooves of the outer race, and (c) a plurality of balls disposed between the ball grooves of the outer race and the ball grooves of the inner race, wherein the ball grooves of at least one of the outer race and the inner race are partially formed with escape or relief profiles to provide a plurality of relief groove portions such that a load applied to each of the balls located in the relief groove portions during torque transmission between the inner race and the outer race is smaller than a load applied to each of the balls located in the other portions of the ball grooves.

Upon rotation of the constant velocity joint constructed as described above, each of the balls interposed between the ball grooves formed in an outer spherical surface of the inner race and the ball grooves formed in an inner spherical surface of the outer race functions to transmit a load therethrough so as to perform torque transmission between the inner race and the outer race.

With the ball grooves partially formed with escape or relief profiles as described above, part of the balls move into the relief groove portions during rotation of the joint, depending upon an angle (i.e., joint angle) formed by the rotation axis of the inner race and that of the outer race. In this condition, a load applied to each of the balls located in the relief groove portions during torque transmission is smaller than a load applied to the balls located in the other portions of the ball grooves.

Accordingly, the relief groove portions are required to have a smaller mechanical strength than the other portions of the ball grooves, and thus assures sufficiently high durability even if they have reduced groove depths. By forming parts of the ball grooves having reduced depths with relief profiles to provide the relief groove portions, therefore, the small-depth parts of the ball grooves still exhibit sufficiently high durability.

Furthermore, the reduction in the required groove depth in the relief groove portions leads to an enhanced freedom in the design of the joint in terms of, for example, the radius of curvature of the ball grooves and the ball size, and also leads to reductions in the size and weight of the constant velocity joint.

According to another aspect of the invention, there is provided a constant velocity joint including (a) an outer race having a plurality of ball grooves formed in an inner spherical surface thereof, the ball grooves extending in a direction of a rotation axis of the outer race, (b) an inner race having a plurality of ball grooves formed in an outer spherical surface thereof, the ball grooves extending in a direction of a rotation axis of the inner race and being paired with the ball grooves of the outer race, and (c) a plurality of balls disposed between the ball grooves of the outer race and the ball grooves of the inner race, wherein the ball grooves of at least one of the outer race and the inner race are partially formed with relief profiles to provide a plurality of relief groove portions such that a clearance between each of the balls located in the relief groove portions and inner walls of the ball grooves as viewed in a circumferential direction is larger than a clearance between each of the balls located in the other portions of the ball grooves and the inner walls of the ball grooves.

In the constant velocity joint constructed as described above, a load applied to each of the balls located in the relief groove portions during torque transmission can be made smaller than a load applied to the balls located in the other portions of the ball grooves, thus assuring sufficiently high durability even if the relief groove portions have reduced depths Furthermore, the reduction in the required groove depth in the relief groove portions leads to an enhanced freedom in the design of the joint in terms of, for example, the radius of curvature of the ball grooves and the ball size, and also leads to reductions in the size and weight of the constant velocity joint.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 7 is a graph indicating the relationship between the ball position and the contact angle at which the ball contacts the side walls of the corresponding ball grooves;

DETAILED DESCRIPTION OF PREFERRED EMBODIMENTS

One exemplary embodiment of the invention will be described in detail with reference to the accompanying drawings.

Figure 1:
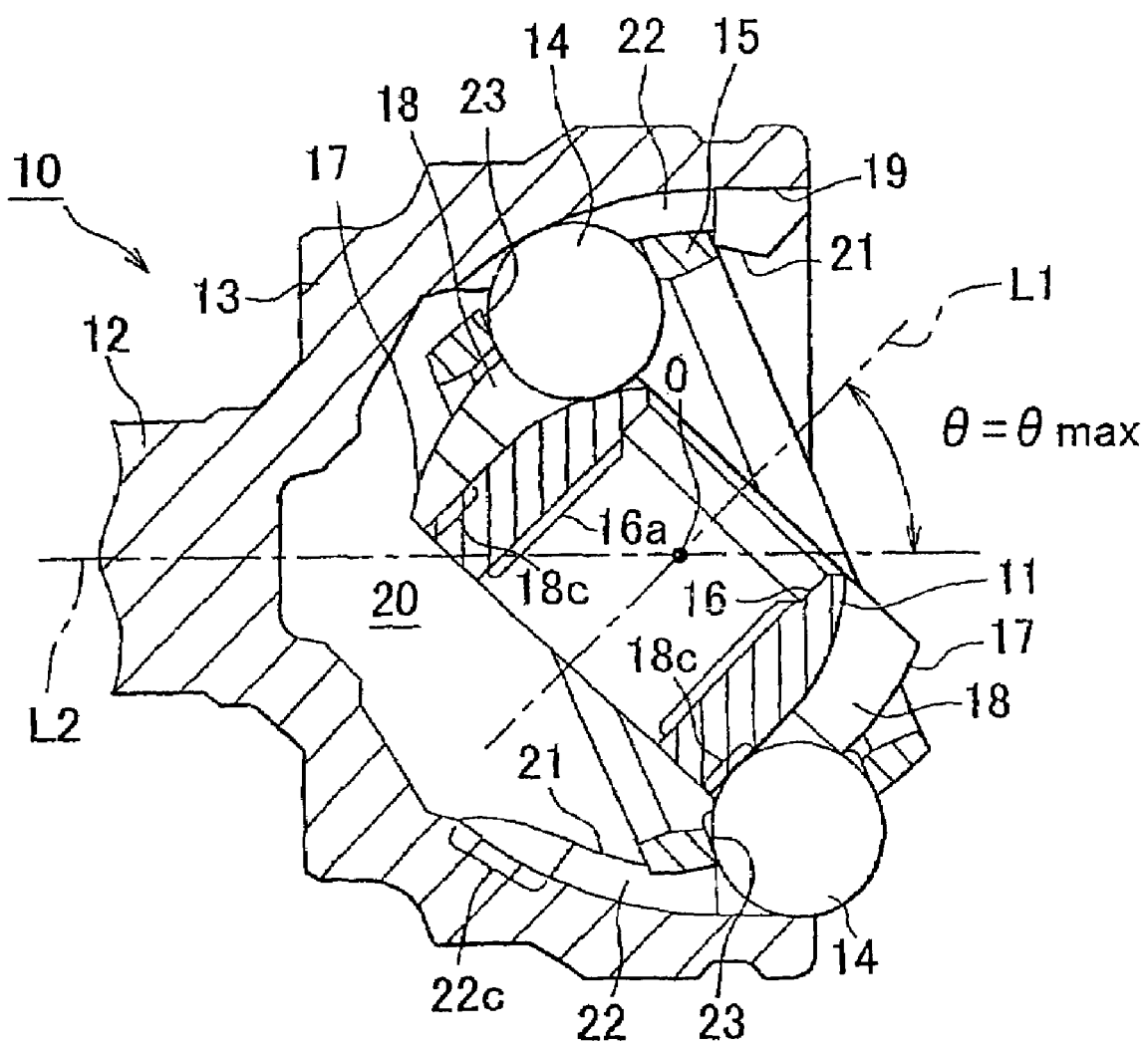
FIG. 1 is a cross-sectional view showing a longitudinal cross section of a constant velocity joint according to one embodiment of the invention.

A constant velocity joint 10 according to the embodiment of the invention as shown in FIG. 1 generally includes an inner race 11 connected to an end portion of a driving shaft (not shown), and an outer race 13 connected integrally to a driven shaft 12. The constant velocity joint 10 further includes a plurality of balls 14 (i.e., six balls in this embodiment) that are interposed between the inner race 11 and the outer race 13 and are arranged to transmit torque between the inner and outer races 11, 13, and a cage 15 for holding these balls 14. FIG. 1 shows a state of the constant velocity joint 10 in which the joint angle θ is equal to the maximum angle θmax.

A through-hole 16 is formed in the inner race 11 to extend through the inner race 11 in the direction of its rotation axis L1, as shown in FIG. 1. A spline 16a extending in the direction of the rotation axis L1 is formed in the inner circumferential wall of the through-hole 16. By fitting the end portion of the driving shaft into the through-hole 16, the inner race 11 and the driving shaft are connected to each other such that the inner race 11 is rotatable as a unit with the driving shaft.

An outer spherical surface 17 having a generally spherical shape is formed on the outer periphery of the inner race 11. A plurality of ball grooves 18 (i.e., six grooves in this embodiment) whose number is the same as that of the balls 14 are formed in the outer spherical surface 17, such that the ball grooves 18 are spaced from each other at equal intervals about the rotation axis L1. Each of the ball grooves 18 extends in the direction of the rotation axis L1 of the inner race 11.

On the other hand, the outer race 13 has an opening 19 formed at a distal end thereof (on the right-hand side in FIG. 1) such that a cavity 20 that receives the inner race 11 is formed in the outer race 13. The cavity 20 of the outer race 13 is defined by an inner spherical surface 21 having a generally spherical shape. A plurality of ball grooves 22 (i.e., six grooves in this embodiment) whose number is the same as that of the balls 14 are formed in the inner spherical surface 21 of the outer race 13, such that the ball grooves 22 are spaced at equal intervals about the rotation axis L2 of the outer race 13, and are respectively opposed to the ball grooves 48 of the inner race 11. Each of the ball grooves 22 extends in the direction of the rotation axis L2 of the outer race 13.

The cage 15 as indicated above is disposed between the outer spherical surface 17 of the inner race 11 and the inner spherical surface 21 of the outer race 13. The cage 15 is formed with a plurality of ball holding windows 23 (six windows in this embodiment) whose number is the same as that of the balls 14, such that the ball holding windows 23 are spaced from each other at equal intervals in the circumferential direction thereof. Each of the balls 14 is interposed between the corresponding ball grooves 18, 20 of the inner and outer races 11, 13 while being received or held in a corresponding one of the ball holding windows 23 of the cage 15.

Next, the profiles of the ball grooves 18, 22 of the constant velocity joint 10 according to the present embodiment will be described referring to FIG. 2 and FIG. 3.

Figure 2:
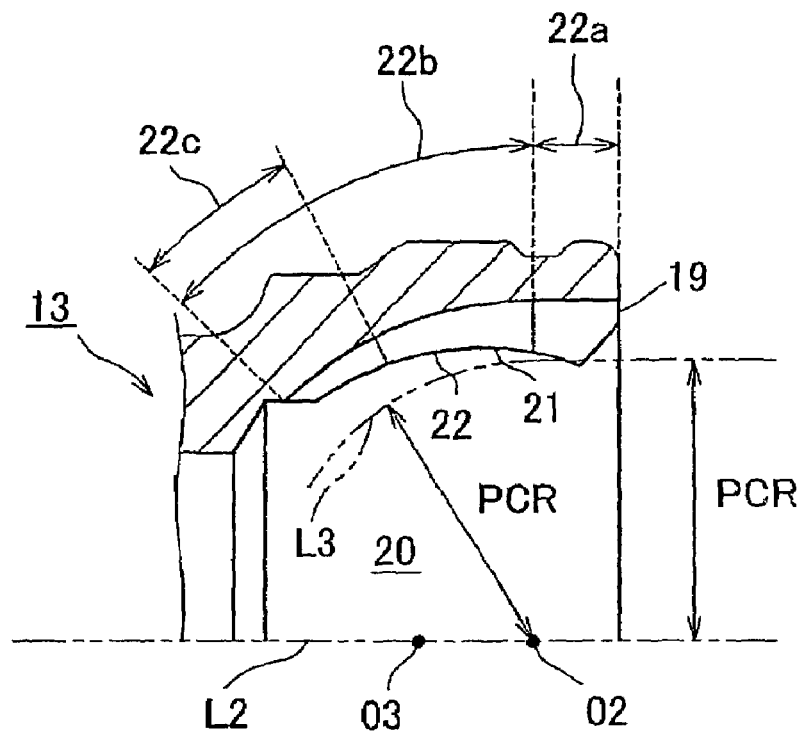
FIG. 2 is a cross-sectional view showing a part of a longitudinal cross section of an outer race of the constant velocity joint of FIG. 1.
Figure 3:
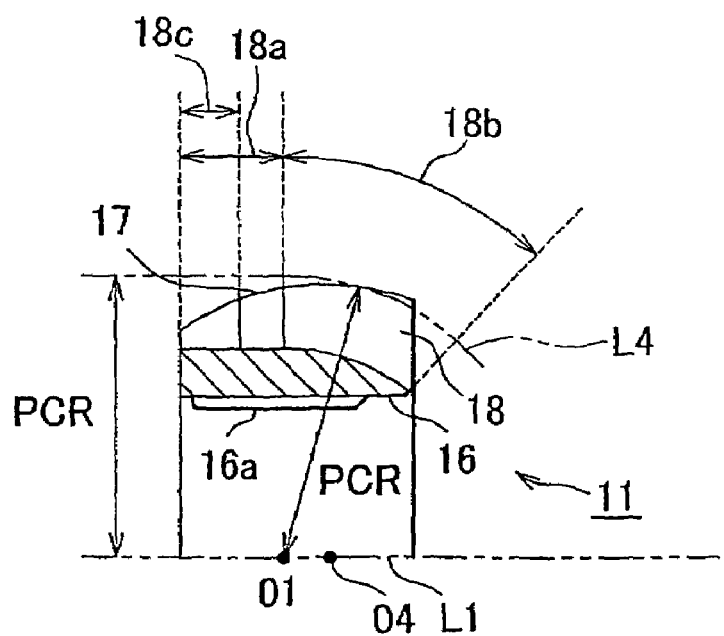
FIG. 3 is a cross-sectional view showing a part of a longitudinal cross section of an inner race of the constant velocity joint of FIG. 1.

FIG. 2 shows a cross section of the outer race 13 as viewed from one side thereof, and FIG. 3 shows a cross section of the inner race 11 as viewed from one side thereof. A curve L3 shown in FIG. 2 is a trajectory of the center of curvature of the side walls of each ball groove 22 taken in a plane perpendicular to the direction of the rotation axis L2 in which the ball grooves 22 extend. Similarly, a curve L4 as shown in FIG. 3 is a trajectory of the center of curvature of the side walls of each ball groove 18 taken in a plane perpendicular to the direction of the rotation axis L1 in which the ball grooves 18 extend. Namely, the curves L3, L4 show a trajectory of the center of the ball 14 that is guided along the respective ball grooves 18, 22. In the following description, the curve L3, L4 will be called "center-of-curvature line" of each ball groove 18, 22.

In this specification, the end portion (on the right-hand side of FIG. 1 and FIG. 2) of the outer race 13 (as viewed in the direction of the rotation axis L2) in which the opening 19 is formed will be referred to as "open end portion" or "open end", and the opposite end portion (on the left-hand side of FIG. 1 and FIG. 2) of the outer race 13 opposite to the open end portion will be referred to as "inner end portion" or "innermost side". Similarly, the right-hand side portion of the inner race 11 as viewed in the direction of the rotation axis L1 in FIG. 1 will be referred to as "open end portion" or "open end", and the left-hand side portion thereof as viewed in FIG. 1 will be referred to as "inner end portion" or "innermost side".

As shown in FIG. 2, each ball groove 22 of the outer race 13 includes a straight groove portion 22a formed at the open end portion thereof, and an arcuate groove portion 22b formed on the inner side thereof. In the straight groove portion 22a, the ball groove 22 extends in a direction parallel to the rotation axis L2 of the outer race 13 in a plane that extends along the rotation axis L2.

In the arcuate groove portion 22b, the ball groove 22 extends along an arc having a center of curvature O2 on the rotation axis L2. As shown in FIG. 2, the center of curvature O2 of the arcuate groove portion 22b is located on the rotation axis L2 at a position that is offset by a predetermined length toward the open end from the center of curvature O3 of the inner spherical surface 21 of the outer race 13.

A distance from the center of curvature O2 to the center-of-curvature line L3 in the arcuate groove portion 22b and a distance from the rotation axis L2 to the center-of-curvature line L3 in the straight groove portion 22a will be called "radius of curvature (PCR) of the outer race ball groove 22".

As shown in FIG. 3, each ball groove 18 of the outer spherical surface 17 of the inner race 11 includes a straight groove portion 18a formed on the inner side, and an arcuate groove portion 18b formed at the open end portion. In the straight groove portion 18a, the ball groove 18 extends in a direction parallel to the rotation axis L1 of the inner race 11 in a plane that extends along the rotation axis L1. In the arcuate groove portion 18b, the ball groove 18 extends along an arc having a center of curvature O1 on the rotation axis L1. As shown in FIG. 3, the center of curvature O1 of the arcuate groove portion 18b is located on the rotation axis L1 at a position offset by a predetermined length toward the innermost side from the center of curvature O4 of the outer spherical surface 17 of the inner race 11.

A distance from the center of curvature O4 to the center-of-curvature line L4 in the accuate or arc groove portion 18b and a distance from the rotation axis L1 to the center-of-curvature line L4 in the straight groove portion 18a will be called "radius of curvature (PCR) of the inner race ball groove 18.

The radius of curvature PCR of the inner race ball groove 18 is made slightly smaller than that (PCR) of the outer race ball groove 22 so as to permit smooth movements of the ball 14 between the ball grooves 18, 22. Namely, the ball 14 is disposed between the ball grooves 18, 22 with a slight clearance left in the radial direction. A difference between the PCR of the inner race ball groove 18 and the PCR of the outer race ball groove 22 is called "PCR clearance".

Thus, the constant velocity joint 10 of this embodiment is constructed as the UF-type constant velocity joint as described above in which the open end portion of each ball groove 22 formed in the inner spherical surface 21 of the outer race 13 provides a straight groove that extends in parallel with the rotation axis L2.

In the constant velocity joint 10 constructed as described above, each ball 14 is moved along the corresponding ball grooves 18, 22 so that the rotation axis L1 of the inner race 11 tilts about a fixed center O, relative to the rotation axis L2 of the outer race 13.

In operation, torque is transmitted through the balls 14 interposed between the respective ball grooves 18, 22, so that the driven shaft 12 connected to the outer race 13 is rotated in accordance with rotation of the driving shaft connected to the inner race 11. At this time, the side walls of the ball grooves 18, 22 restrict displacement of each ball 14 in the circumferential direction of the inner race 11 or the outer race 13, thereby inhibiting the inner race 11 and the outer race 13 from rotating relative to each other. With this arrangement, the inner race 11 and the outer race 13 can be rotated at an equal angular velocity while at the same time permitting changes of the joint angle $\theta$.

As shown in FIG. 2, the center of curvature O2 of the arcuate groove portion 22b is offset from the center of curvature O3 of the inner spherical surface 21 in the outer race 13, and therefore the depth of the groove of the arcuate groove portion 22b decreases toward the innermost side (i.e., left-hand side in FIG. 2). Also, as shown in FIG. 3, the depth of the straight groove portion 18a of the inner race 11 decreases toward the innermost side (i.e., left-hand side in FIG. 3).

In the constant velocity joint 10 of this embodiment, portions (18c, 22c) of the ball grooves 18, 22 having a decreasing groove depth are formed as "relief groove portions". Cross sections of the relief groove portions 18c, 22c taken in a direction perpendicular to the center-of-curvature lines L3, IA, respectively, are formed with relief profiles such that clearances between the balls 14 and the side walls of the ball grooves 18, 22 as measured in the circumferential direction of the inner race 11 or the outer race 13 in the relief groove portions 18c, 22c are made larger than those in the other portions of the ball grooves 18, 22.

Here, the position of each ball groove 18, 22 as viewed in the longitudinal direction is represented by a groove-section joint angle $\phi$, which is defined as follows.

Figure 4:
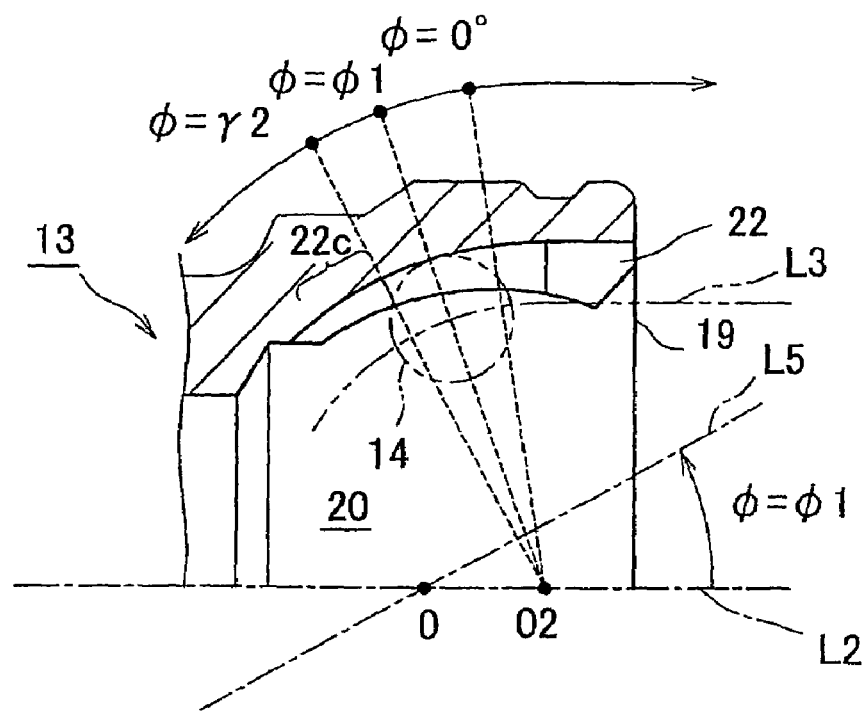
FIG. 4 is a cross-sectional view showing a part of a longitudinal cross section of the outer race.

FIG. 4 shows a cross section of the outer race 13 taken in a plane that contains both the center-of-curvature line L3 of a certain ball groove 22 of the outer race 13 and the rotation axis L2 of the outer race 13. A straight line L5 as shown in FIG. 4 indicates the rotation axis L1 of the inner race 11 when the ball 14 is located on the ball groove 22 at the position of FIG. 4 where the joint angle is taken in the above-described cross section.

Here, an angle ϕ of inclination of the straight line L5 with respect to the rotation axis L2 in the counter clockwise direction is called "groove-section joint angle" associated with the outer race 13. When the groove-section joint angle ϕ is equal to a certain angle ϕ1, the position of the ball groove 22 at which the ball 14 contacts the side walls of the groove 22 is called "ϕ1 position", which indicates that the groove-section joint angle ϕ established with the ball 14 located in this position of the ball groove 22 is equal to 1.

Figure 5:
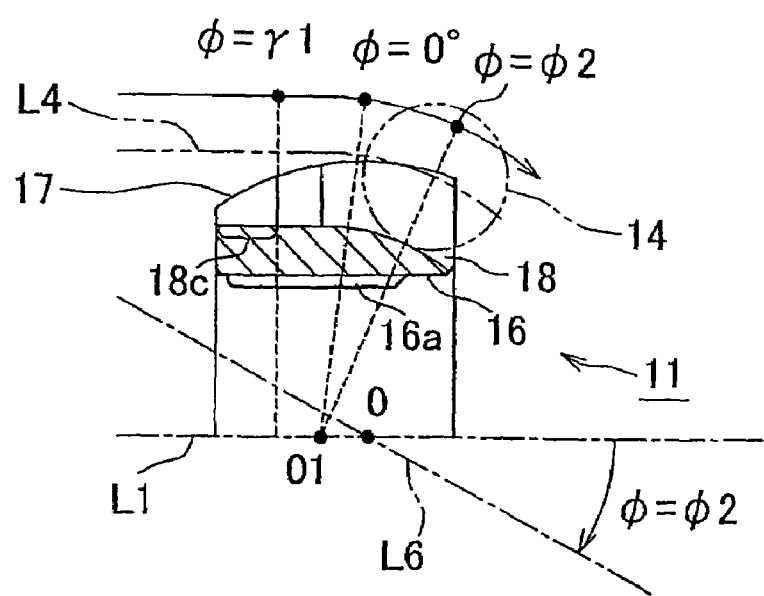
FIG. 5 is a cross-sectional view showing a part of a longitudinal cross section of the inner race.

Similarly, the position of the ball groove 18 of the inner race 11 is represented by the groove-section joint angle ϕ. FIG. 5 shows a cross section of the inner race 11 taken in a plane that contains both the center-of-curvature line L4 of a certain ball groove 18 of the inner race 11 and the rotation axis L1 of the inner race 11. A straight line L6 as shown in FIG. 5 indicates the rotation axis L2 of the outer race 13 when the ball 14 is located on the ball groove 18 at the position of FIG. 5 where the joint angle is taken in the above-described cross section.

Here, an angle ϕ of inclination of the straight line L6 with respect to the rotation axis L1 in the clockwise direction is called "groove-section joint angle" associated with the inner race 11. When the groove-section joint angle ϕ is equal to a certain angle ϕ2, the position of the ball groove 18 at which the ball 14 contacts the side walls of the groove 18 is called "ϕ2 position", which indicates that the groove-section joint angle ϕ established with the ball 14 located in this position of the ball groove 18 is equal to ϕ2.

The definition of the groove-section angle ϕ has been described above. In the present embodiment, the range of the relief groove portion 18c, 22c in each of the ball grooves 18, 22 is set and expressed in the manner as described below, using the groove-section joint angle ϕ.

More specifically, a portion of each ball groove 22 of the outer race 13 in which the groove-section joint angle ϕ is equal to or larger than a predetermined angle ϕa (=γ2) is set as the above-indicated relief groove portion 22c. Also, a portion of each ball groove 18 of the inner race 11 in which the groove-section joint angle ϕ is equal to or smaller than a predetermined angle −ϕa (=γ1) is set as the relief groove portion 18c.

In the constant velocity joint 10 as described above, when the joint angle θ is equal to 0°, each ball 14 is held at a position where the groove-section joint angle ϕ of the ball grooves 18, 22 is equal to 0°, irrespective of the rotational phase of the inner race 11 and the outer race 13. In this condition, torque transmission between the inner race 11 and the outer race 13 is carried out with the torque substantially equally distributed to all of the balls 14. Namely, substantially the same portion of torque is applied to each ball 14, to perform torque transmission between the inner race 11 and the outer race 13.

When the rotation axis L2 of the outer race 13 is inclined relative to rotation axis L1 of the inner race 11, each ball 14 reciprocates along the corresponding ball grooves 18, 22 in accordance with changes in the rotational phase of the inner race 11 and the outer race 13. When the joint angle θ is equal to θ1 (0°<θ1≦θmax), the ball 14 moves in the corresponding ball grooves 18, 22 within a range from a position at which the groove-section joint angle ϕ is equal to −θ1 to a position at which the groove-section joint angle ϕ is equal to θ1. As the joint angle θ increases, the range of movement of the ball 14 in the ball grooves 18, 22 increases both on the side of the open end and the inner side with its center set at a position where the groove-section joint angle ϕ is equal to 0°.

When the joint angle θ is less than the above-indicated angle ϕa, all of the balls 14 are located at portions of the ball grooves 18, 22 other than the relief groove portions 18c, 22c, irrespective of the rotational phase of the inner race 11 and the outer race 13. In this condition, torque transmission between the inner race 11 and the outer race 13 is performed with the torque distributed to all of the balls 14.

When the joint angle θ is equal to or greater than the above-indicated angle ha, each ball 14 enters the relief groove portions 18c, 22c of the corresponding ball grooves 18, 22, depending upon the rotational phase of the inner race 11 and the outer race 13.

In this condition, a load applied to each of the balls 14 for torque transmission is reduced when the ball 14 is located in the ranges of the relief groove portions 18c, 22c having increased clearances between the ball 14 and the side walls of the ball grooves 18, 22, as compared with a load applied to each of the balls 14 located outside of the ranges of the relief groove portions 18c, 22c. In this case, the reduced amount of torque is distributed to the balls 14 located outside of the ranges of the relief groove portions 18c, 22c.

Thus, in the present embodiment, the portions of the ball grooves 18, 22 having relatively small groove depths are formed with relief profiles as described below, and therefore load (torque) transmission through the balls 14 located in the relief regions can be reduced or suppressed.

Next, the cross-sectional shapes of the relief groove portions 18c, 22c of the ball grooves 18, 22 will be described in detail with reference to FIG. 6A and FIG. 6B.

Figure 6A:
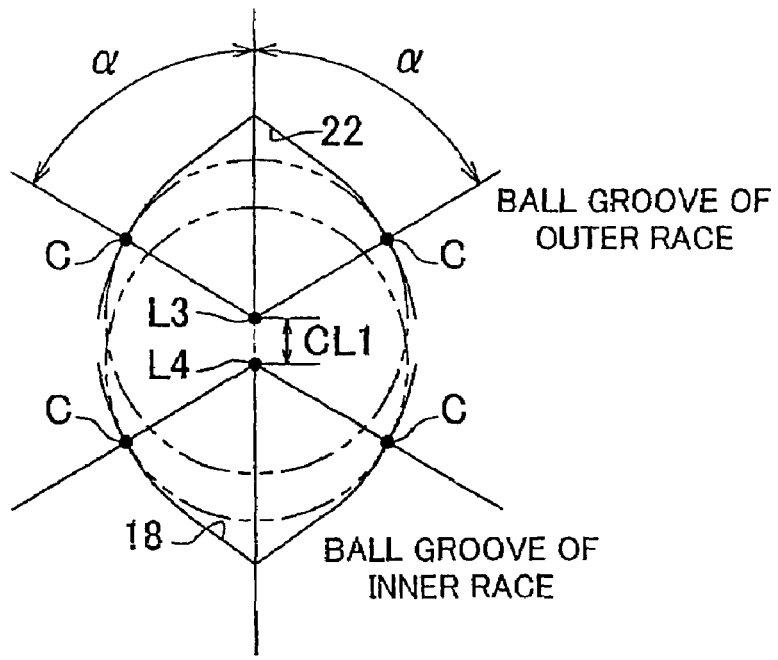
FIGS. 6A-6C are schematic views showing examples of engagement between a ball and ball grooves.

FIG. 6A shows a ball 14 which engages with portions of the ball grooves 18, 22 other than the relief groove portions 18c, 22c. It is to be noted that in FIG. 6A through 6C, clearances between the side walls of the ball grooves 18, 22 and the ball 14 are emphasized.

As shown in FIG. 6A, ball contact angles (which will be described later) at which the ball 14 contacts with the side walls of the ball grooves 18, 22 are all set to a predetermined angle α over the entire regions of the portions of the ball grooves 18, 22 other than the relief groove portions 18c, 22c. In these portions of the ball grooves 18, 22, the PCR clearance as indicated above is set to a predetermined length CL1.

The ball contact angle means an angle formed between line La and line Lb as follows. The line La is a centerline as viewed in the circumferential direction of the ball groove 18, 22 in a plane perpendicular to the center-of-curvature line L4, L3. More specifically, the line La is a straight line that connects the center-of-curvature line L4 of the ball groove 18 with the rotation axis L1 of the inner race 11 in the above-indicated plane, or a straight line that connects the center-of-curvature line L3 of the ball groove 22 with the rotation axis L2 of the outer race 13. The line Lb is a straight line that connects a contact point C at which the ball 14 contacts with each side wall of the ball groove (18, 22) with the center of the ball 14.

Figure 6B:
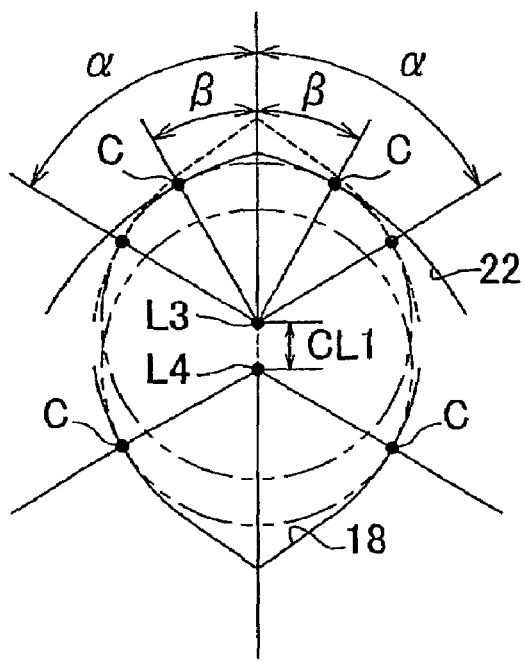

In the relief groove portion 22c, on the other hand, the cross-sectional shape of the ball groove 22 is formed such that the contact point C as indicated above is located closer to the center of the ball groove 22, namely, the ball contact angle is equal to angle β that is smaller than the above-indicated angle α as shain in FIG. 6B With the relief groove portion 22c thus formed, clearances between the ball 14 and the side walls of the ball groove 22 in the relief groove portion 22c are expanded or increased. Similarly, in the relief groove portion 18c of the inner race 11, the cross-sectional shape of the ball groove 18 is formed such that the ball contact angle becomes smaller than the above-indicated angle α.

In the present embodiment, the ball contact angle in the ball groove 22 of the outer race 13, which is equal to the angle cc in the portions other than the relief groove portion 22c, gradually decreases from the initial position of the relief groove portion 22c, namely, the position at which the groove-section joint angle α is equal to φa (=γ2), toward the innermost side as shown in FIG. 7. Similarly, the ball contact angle in the ball groove 18 of the inner race 11, which is equal to the angle a in the portions other than the relief groove portion 18c, gradually decreases from the initial position of the relief groove portion 18c, namely, the position at which the groove-section joint angle φ is equal to −φa (=γ1), toward the innermost side.

With the ball contact angle thus reduced in the relief groove portion 18c, 22c as compared with that in the other portions of the ball groove 18, 22, a load carried by each of the balls 14 located in the relief groove portion 18c, 22c during torque transmission is reduced.

As the ball contact angle of each ball groove 18, 22 is reduced as described above, the required depth of the ball groove 18, 22 for ensuring the ball contact point C is also reduced. Therefore, the groove depth of the relief groove portion 18c, 22c can be further reduced, which leads to increased choices in respective dimensions of each ball groove 18, 22, such as PCR dimensions and the diameter of the ball 14, and an enhanced freedom in the design of the constant velocity joint 10.

The cross-sectional shape of the relief groove portion 18c, 22c has been described in detail. Next, the set ranges of the relief groove portions 18c, 22c in the ball grooves 18, 22 will be described in detail with reference to FIGS. 9A through 9D.

As described above, in the relief groove portion 18c, 22c, clearances between the ball 14 and the side walls of the ball groove 18, 22 as measured in the circumferential direction of the inner race 11 or the outer race 13 are expanded. If all of the six balls 14 are located in the ranges of the relief groove portions 18c, 22c, the inner race 11 and the outer race 13 are permitted to rotate relative to each other, and cannot perform their constant-velocity rotary motion with sufficiently high reliability.

To constantly ensure the constant-velocity rotation of the inner race 11 and the outer race 13, it is desirable to locate at least three of the balls 14 in the portions of the ball grooves 18, 22 other than the relief groove portions 18c, 22c, no matter what joint angle is, i.e., no matter what rotational phase is established between the inner and outer races 11, 13.

Figure 9A:
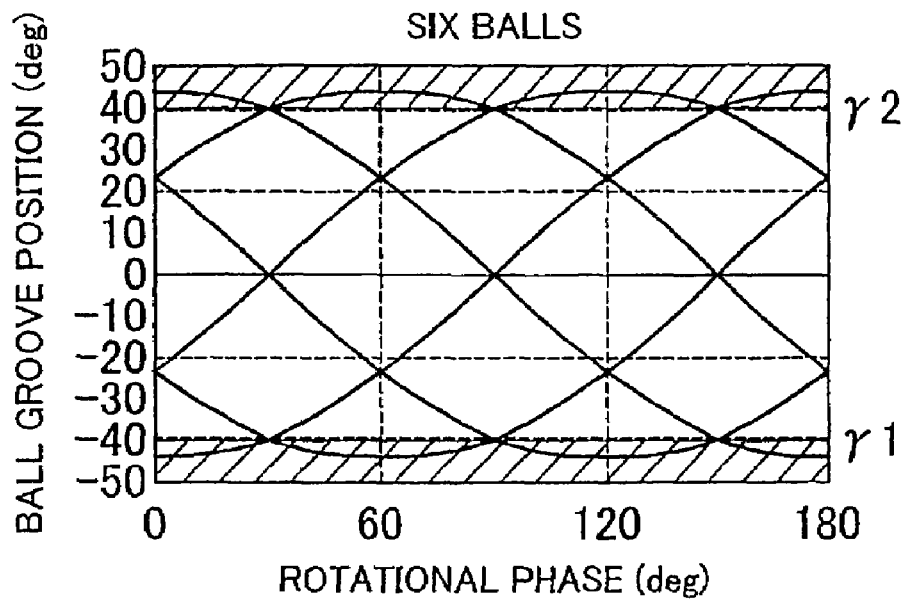
FIG. 9A-9D are graphs indicating the relationship between the rotational phase of the constant velocity joint and the position of each ball.

FIG. 9A shows changes in the position of each ball 14 (i.e., the groove-section joint angle φ of the ball groove 18, 22 at which each ball 14 is located) in relation to the rotational phase of the inner race 11 and the outer race 13 when the constant velocity joint 10 of this embodiment having six balls 14 is rotated with the joint angle θ being equal to the maximum angle Θmax.

In the constant velocity joint 10 of this embodiment, four or more balls 14 are always present in the range in which the groove-section joint angle φ is between γ1 and γ2 even when the joint angle θ is equal to the maximum angle θmax, as shown in FIG. 9A. In this embodiment, therefore, the relief groove portions 18c, 22c are set to the range in which the groove-section joint angle φ is equal to or larger than γ2 and the range in which the groove-section joint angle φ is equal to or smaller than γ1, respectively, so that three or more balls 14 are always present in the portions of the ball groves 18, 22 other than the relief groove portions 18c, 22c.

The set ranges of the relief groove portions required for ensuring constant velocity rotation of the inner race 11 and the outer race 13 vary with the construction or arrangement of the constant velocity joint, including the number of balls and the maximum joint angle.

Figure 9B:
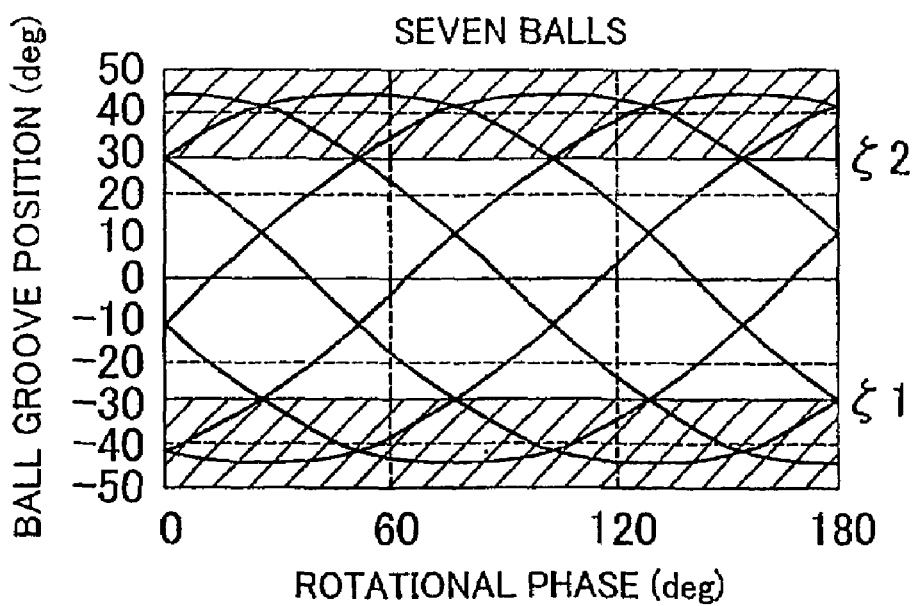
Figure 9C:
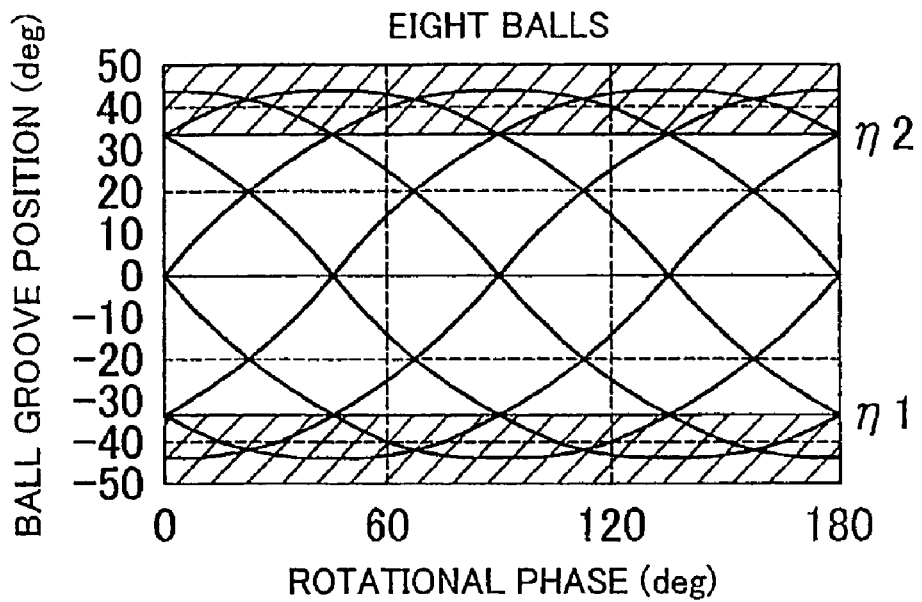
Figure 9D:
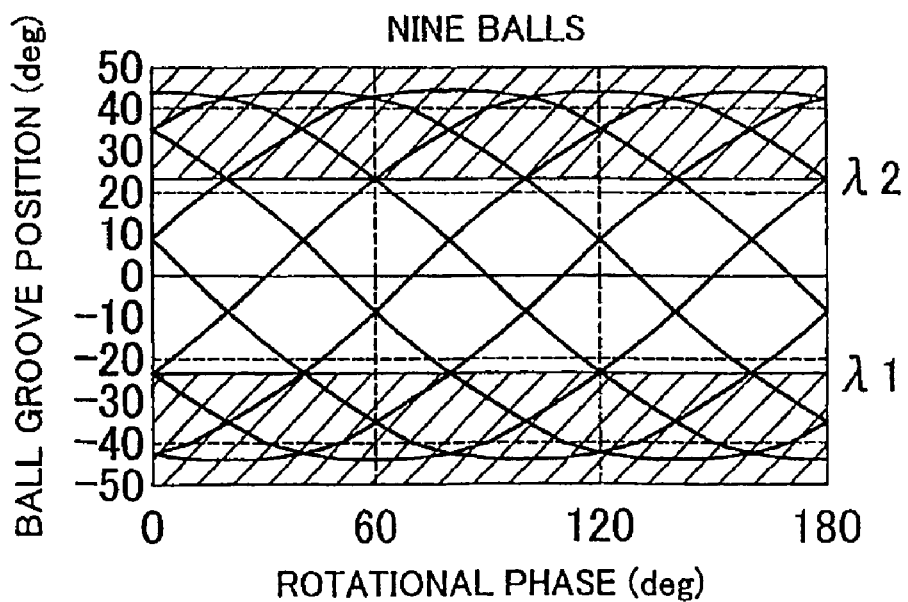

FIG. 9B-9D show changes in the position of each ball in relation to the rotational phase of the inner race and the outer race when constant velocity joints having seven, eight and nine balls, respectively, rotate in a condition in which the joint angle is set to the maximum angle.

As shown in FIG. 9B illustrating the case where the constant velocity joint has seven balls, three or more balls are always present in the range in which the groove-section joint angle φ is between ξ1 and ξ2 irrespective of the rotational phase, even when the joint angle θ is equal to the maximum angle θmax. In this example, therefore, the relief groove portions are set to the ranges in which the groove-section joint angle φ is equal to or smaller than ξ1 and the range in which the groove-section joint angle φ is equal to or larger than ξ2, respectively, so that the inner race and the outer race ensure constant-velocity rotary motion.

Similarly, in the constant velocity joint having eight balls, three or more balls can be always located in the portions of the ball grooves other than the relief groove portions if the relief groove portions are set to be outside of the range of η1 to η2, as shown in FIG. 9C. Also, in the constant velocity joint having nine balls, three or more balls can be always located in the portions of the ball grooves other than the relief groove portions if the relief groove portions are set to be outside of the range of λ1 and λ2, as shown in FIG. 9D.

The constant velocity joint 10 of the embodiment as described above yields the following effects.

(1) In the present embodiment, the innermost portions 18c, 22c of the ball grooves 18, 22 formed in the outer spherical surface 17 of the inner race 11 and the inner spherical surface 21 of the outer race 13 are formed with relief profiles such that clearances between the ball 14 and the side walls of the ball grooves 18, 22 in the circumferential direction are expanded or increased. The relief groove portions 18c, 22c having the relief profiles and relatively small groove depths are arranged to receive the ball 14 only when the joint angle θ is large. In operation of the constant velocity joint 10, a load carried by each ball 14 received in the relief groove portions 18c, 22c is reduced during torque transmission. Therefore, the constant velocity joint 10 exhibits improved durability, even if the relief groove portions 18c, 22c have relatively small groove depths.

(2) Since a reduced load is applied to the side walls of the relief groove portions 18c, 22c of the ball grooves 18, 22 during torque transmission, the required groove depth of the relief groove portions can be set to a smaller value than those of conventional counterparts. The reduction in the groove depth leads to increased ranges of choices in the PCR of each ball groove 18, 22 and the ball diameter or size, and also leads to an enhanced freedom in the design of the constant velocity joint 10. Consequently, the size and weight of the constant velocity joint 10 can be advantageously reduced.

(3) In the present embodiment, the ranges of the relief groove portions 18c, 22c are set so that three or more balls 14 are always located on the portions of the ball grooves 18, 22 other than the relief groove portions 18c, 22c, irrespective of the joint angle and the rotational phase of the inner race 11 and the outer race 13. With this arrangement, the rotational phase of the inner race 11 and the outer race 13 is held by at least three balls 14, thus assuring constant-velocity rotary motion of the constant velocity joint 10.

(4) In the present embodiment, the relief groove portions 18c, 22c are formed by setting the ball contact angles in these portions 18c, 22c to be smaller than those in the other portions of the ball grooves 18, 22. With the relief groove portions 18c, 22c thus formed, a load carried by the ball 14 located in the relief groove portions 18c, 22c during torque transmission can be appropriately reduced. In addition, the groove depth required for ensuring contact points with the ball 14 can be reduced in the relief groove portions 18c, 22, which results in a further enhanced freedom in the design of the constant velocity joint 10.

The above-described embodiment may be modified as follows.

Initially, a modified example in which the profiles of the ball grooves in the relief groove portions are modified will be described. The cross-sectional shape of the ball grooves 18, 22 may be changed as shown in, for example, FIG. 6C, so as to increase the clearances in the relief groove portions 18c, 22c.

Figure 6C:
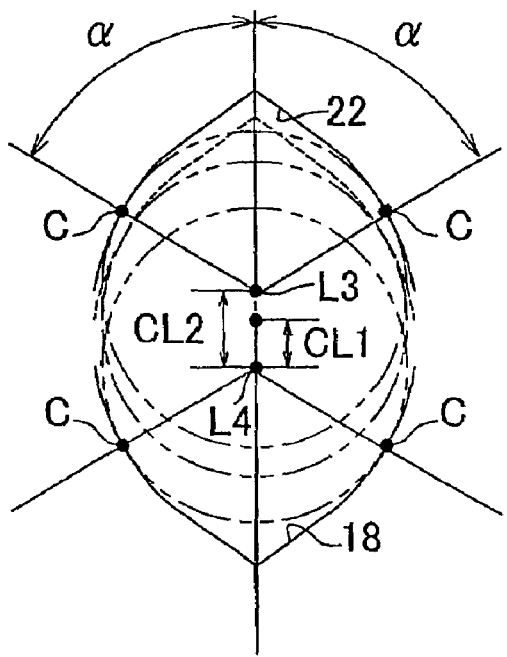

In the example of FIG. 6C, the PCR of the ball groove 22 in the relief groove portion 22c is made longer than that in the other portions, so that the PCR clearance CL2 in the relief groove portion 22c is made larger than the above-indicated predetermined length CL1 (CL2>CL1). By increasing the PCR clearance between the ball grooves 18, 22 in this manner, clearances between the ball 14 and the side walls of the ball grooves 18, 22 can be increased.

Figure 8:
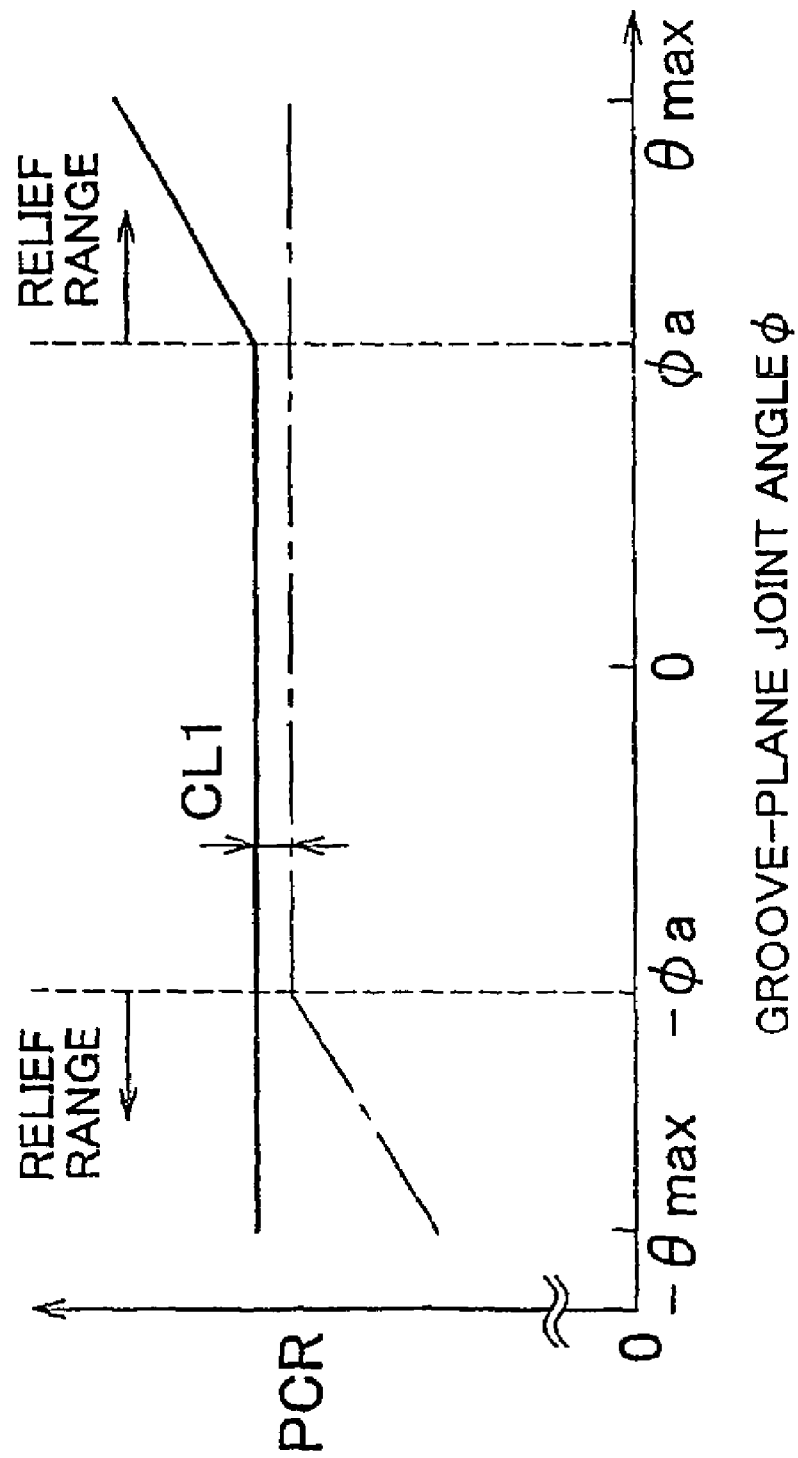
FIG. 8 is a graph showing the relationship between the ball position and the PCR clearance.

For example, the relief groove portions 18c, 22c may be formed by setting the PCR of each of the ball grooves 18, 22, as shown in FIG. 8. In the example of FIG. 8, the PCR of the ball groove 22 of the outer race 13 is gradually increased from the start position of the relief groove portion 22c (at which the groove-section joint angle $\phi$ is equal to $\phi a$) toward the innermost side, so that the PCR clearance gradually increases from the above-indicated predetermined length CL1.

Similarly, the PCR of the ball groove 18 of the inner race 11 is gradually reduced from the start position of the relief groove portion 18c (at which the groove-section joint angle $\phi$ is equal to $-\phi a$) toward the innermost side, so that the PCR clearance gradually increases from the above-indicated predetermined length CL1.

In the above arrangement in which the PCR clearances in the relief groove portions 18c, 22c are made larger than those in the other portions of the ball grooves 18, 22, the ball 14 between the ball grooves 18, 22 are more loosely held by the side walls of the grooves 18, 22, whereby a reduced load is applied to the ball 14 located in the relief groove portions 18c, 22c during torque transmission between the inner race 11 and the outer race 13. If the PCR clearance is further increased to a certain extent, the load applied to the ball 14 in the relief groove portions 18c, 22c during torque transmission can be made zero, namely, the ball 14 located in the relief groove portions 18c, 22c can be made completely free from torque transmission.

It is to be understood that the manner of changing the ball contact angle in the set ranges of the relief groove portions 18c, 22c and the manner of changing the PCR of each of the ball grooves 18, 22 are not limited to those as shown in FIG. 7 and FIG. 8, but may be suitably changed.

It is also possible to form the relief groove portions 18c, 22c by reducing the contact angle in each of the ball grooves 18, 22 as well as increasing the PCR clearance of the ball grooves 18, 22.

The relief groove portions may also be formed by a method other than the reduction of the ball contact angle, the increase of the PCR clearance, and a combination thereof. In short, the above-described effects of the illustrated embodiment or equivalent or similar effects can be obtained provided that the ball grooves are formed such that the load applied to each of the balls 14 in the relief groove portions is made smaller than that applied to each of the balls 14 in the other portions of the ball grooves.

The manner of setting the ranges of the relief groove portions 18c, 22c is not limited to that of the illustrated embodiment, but may be changed as desired. Examples of the set positions of the relief groove portions will be listed below.

(a) A region of the ball groove 18 of the outer spherical surface 17 of the inner race 11 in which the groove-section joint angle $\phi$ is equal to or larger than angle 4a and a region of the ball groove 22 of the inner spherical surface 21 of the outer race 13 in which the groove-section joint angle $\phi$ is equal to or smaller than an angle $-\phi a$ are set to the relief groove portions (b) A region of the ball groove 18 of the outer spherical surface 17 of the inner race 11 in which the groove-section joint angle $\phi$ is equal to or larger than angle $\phi a$ and a region of the ball groove 18 in which the groove-section joint angle $\phi$ is equal to or smaller than $-\phi a$ are set to the relief groove portions.

(c) A region of the ball groove 22 of the inner spherical surface 21 of the outer race 13 in which the groove-section joint angle 4 is equal to or larger than angle $\phi a$ and a region of the ball groove 22 in which the groove-section joint angle it is equal to or smaller than angle $-\phi a$ are set to the relief groove portions.

(d) Regions of the ball groove 18 of the outer spherical surface 17 of the inner race 11 and regions of the ball grooves 22 of the inner spherical surface 21 of the outer race 13 in which the groove-section joint angle $\phi$ is equal to or larger than angle $\phi a$ and in which the groove-section joint angle $\phi$ is equal to or smaller than angle $-\phi a$ are set to the relief groove portions.

In any of the modified examples as described above, the load applied to each of the balls 14 located in the relief groove portions can be advantageously reduced. In addition, if the relief groove portions are set as in the modified examples (b), (c) above, the shape of only one of the inner race 11 and the outer race 13 needs to be changed, thus assuring improved durability of the constant velocity joint 10.

Needless to say, the relief groove portions may be set in other manners than those as described above. In short, the relief groove portions may be provided at portions of the ball grooves which are difficult to achieve sufficient mechanical strength, such as those portions having a reduced groove depth due to restrictions on the profiles of, for example, the outer spherical surface 17 of the inner race 11, the inner spherical surface 21 of the outer race 13, and the ball grooves 18, 22. With the relief groove portions thus provided, the durability of the constant velocity joint can be improved without incurring increases in the size or weight.

The illustrated embodiments may also be modified as follows.

The relief groove portions may be formed such that no load is applied to the ball 14 during torque transmission, namely, no torque transmission is carried out by the ball 14, when it is located in a part of the relief groove portion or the entire region thereof. Such a relief groove portion in which no torque transmission occurs may be formed by increasing a clearance in the circumferential direction to a certain extent or more.

In the illustrated embodiment, the relief groove portions 18c, 22c are set such that three or more balls 14 are always located in the regions of the grooves 18, 22 other than the relief groove portions 18c, 22c, irrespective of the joint angle e and the rotational phase. However, the relief groove portions 18c, 22c may be determined otherwise. In this case, too, the effects other than (3) as indicated above may be obtained.

In the illustrated embodiment, the invention is applied to a constant velocity joint of UF (undercut free) type. However, the invention is equally applicable to other types of constant velocity joints using balls provided that the joint is constructed such that a plurality of balls are held between the inner race and the outer race, and such that torque is transmitted through contact points of the balls.

The invention claimed is:

1. A constant velocity joint comprising:
an outer race having a plurality of ball grooves formed in an inner spherical surface thereof, the ball grooves extending in a direction of a rotation axis of the outer race,
an inner race having a plurality of ball grooves formed in an outer spherical surface thereof, the ball grooves extending in a direction of a rotation axis of the inner race and being paired with the ball grooves of the outer race; and
a plurality of balls disposed between the ball grooves of the outer race and the ball grooves of the inner race, wherein:
the ball grooves of at least one of the outer race and the inner race are partially formed with relief profiles to provide a plurality of relief groove portions such that a load applied to each of the balls located in the relief groove portions during torque transmission between the inner race and the outer race is smaller than a load applied to each of the balls located in the other portions of the ball grooves,
wherein the ball grooves of the outer race only include portions of the outer race in which the plurality of balls travel when an angle formed by the rotation axis of the inner race and the rotation axis of the outer race is less than or equal to a maximum operating angle of the constant velocity joint.

2. A constant velocity joint according to claim 1, wherein the relief groove portions are determined so that at least one of the balls exists in the relief groove portions only when the angle formed by the rotation axis of the inner race and the rotation axis of the outer race is equal to or larger than a predetermined value.

3. A constant velocity joint according to claim 1, wherein the relief groove portions are provided at portions of the ball grooves having a reduced depth as compared with those of the other groove portions.

4. A constant velocity joint according to claim 1, wherein the relief groove portions are provided in the ball grooves of the outer race, and are located close to an innermost side of the outer race remote from an open end thereof as viewed in the direction of the rotation axis of the outer race.

5. A constant velocity joint according to claim 1, wherein the relief groove portions are provided in the ball grooves of the inner race, and are located close to an innermost side of the outer race remote from an open end thereof as viewed in the direction of the rotation axis of the inner race.

6. A constant velocity joint according to claim 1, wherein the relief groove portions are formed so that three or more balls are always present in portions of the ball grooves other than the relief groove portions, irrespective of an angle formed by the rotation axis of the inner race and the rotation axis of the outer race and changes in a rotational phase of the rotation axes of the inner and outer races.

7. A constant velocity joint according to claim 1, wherein the relief profiles of the relief groove portions are formed by setting contact points between each of the balls and an inner wall of the corresponding ball groove to be closer to a center of the ball groove, as compared with contact points in the other portions of the ball grooves.

8. A constant velocity joint according to claim 1, wherein the relief profiles of the relief groove portions are formed by setting a difference between a radius of curvature of the ball grooves of the inner race and a radius of curvature of the ball grooves of the outer race in the relief groove portions to be larger than that in the other portions of the ball grooves.

9. A constant velocity joint according to claim 1, wherein at least a part of the ball grooves is provided by a straight groove that extends substantially straight in the direction of the rotation axis of a corresponding one of the inner and outer races.

10. A constant velocity joint according to claim 1, wherein substantially no torque is transmitted via the balls located in the relief groove portions.

11. A constant velocity joint according to claim 1, wherein at least one ball groove of the inner race includes an arcuate groove portion extending along an arc having a center of curvature on the rotational axis of the inner race and a straight groove portion that extends substantially parallel to the direction of the rotational axis of the inner race.

12. A constant velocity joint according to claim 1, wherein at least one ball groove of the outer race includes an arcuate groove portion extending along an arc having a center of curvature on the rotational axis of the outer race and a straight groove portion that extends substantially parallel to the direction of the rotational axis of the outer race.

13. A constant velocity joint according to claim 1, wherein a first ball contact angle of at least one ball groove is set at a predetermined angle over an entire region of a portion of the at least one ball groove other than the relief groove portion of the at least one ball groove.

14. A constant velocity joint according to claim 13, wherein the relief groove portion of the at least one ball groove includes a second ball contact angle that is less than the first ball contact angle.

15. A constant velocity joint according to claim 14, wherein a ball contact angle of the relief groove portion of the at least one ball groove gradually decreases from a first ball contact angle to a second ball contact angle.

16. A constant velocity joint according to claim 1, wherein the ball grooves of the outer race extend from an innermost side of the outer race to an outermost side of the outer race, wherein the innermost side of the outer race corresponds to a position occupied by an innermost one of the plurality of balls when the angle formed by the rotation axis of the inner race and the rotation axis of the outer race is the maximum operating angle of the constant velocity joint, and wherein the outermost side of the outer race corresponds to a position occupied by an outermost one of the plurality of balls when the angle formed by the rotation axis of the inner race and the rotation axis of the outer race is the maximum operating angle of the constant velocity joint.

17. A constant velocity joint according to claim 1, wherein the ball grooves of the outer race extend from an open end portion of the outer race to an inner end portion of the outer race remote from the open end portion.

18. A constant velocity joint according to claim 1, wherein the ball grooves of the inner race only include portions of the inner race in which the plurality of balls travel when the angle formed by the rotation axis of the inner race and the rotation axis of the outer race is less than or equal to the maximum operating angle of the constant velocity joint.

19. A constant velocity joint comprising:
an outer race having a plurality of ball grooves formed in an inner spherical surface thereof, the ball grooves extending in a direction of a rotation axis of the outer race, an inner race having a plurality of ball grooves formed in an outer spherical surface thereof, the ball grooves extending in a direction of a rotation axis of the inner race and being paired with the ball grooves of the outer race; and a plurality of balls disposed between the ball grooves of the outer race and the ball grooves of the inner race, wherein:

the ball grooves of at least one of the outer race and the inner race are partially formed with relief profiles to provide a plurality of relief groove portions such that a clearance between each of the balls located in the relief groove portions and inner walls of the ball grooves as viewed in a circumferential direction is larger than a clearance between each of the balls located in the other portions of the ball grooves and the inner walls of the ball grooves, wherein the ball grooves of the outer race only include portions of the outer race in which the plurality of balls travel when an angle formed by the rotation axis of the inner race and the rotation axis of the outer race is less than or equal to a maximum operating angle of the constant velocity joint.

20. A constant velocity joint according to claim 19, wherein the relief groove portions are determined so that at least one of the balls exists in the relief groove portions only when the angle formed by the rotation axis of the inner race and the rotation axis of the outer race is equal to or larger than a predetermined value.

21. A constant velocity joint according to claim 19, wherein the relief groove portions are provided at portions of the ball grooves having a reduced depth as compared with those of the other groove portions.

22. A constant velocity joint according to claim 19, wherein the relief groove portions are provided in the ball grooves of the outer race, and are located close to an innermost side of the outer race remote from an open end thereof as viewed in the direction of the rotation axis of the outer race.

23. A constant velocity joint according to claim 19, wherein the relief groove portions are provided in the ball grooves of the inner race, and are located close to an innermost side of the outer race remote from an open end thereof as viewed in the direction of the rotation axis of the inner race.

24. A constant velocity joint according to claim 19, wherein the relief groove portions are formed so that three or more balls are always present in portions of the ball grooves other than the relief groove portions, irrespective of an angle formed by the rotation axis of the inner race and the rotation axis of the outer race and changes in a rotational phase of the rotation axes of the inner and outer races.

25. A constant velocity joint according to claim 19, wherein the relief profiles of the relief groove portions are formed by setting contact points between each of the balls and an inner wall of the corresponding ball groove to be closer to a center of the ball groove, as compared with contact points in the other portions of the ball grooves.

26. A constant velocity joint according to claim 19, wherein the relief profiles of the relief groove portions are formed by setting a difference between a radius of curvature of the ball grooves of the inner race and a radius of curvature of the ball grooves of the outer race in the relief groove portions to be larger than that in the other portions of the ball grooves.

27. A constant velocity joint according to claim 19, wherein at least a part of the ball grooves is provided by a straight groove that extends substantially straight in the direction of the rotation axis of a corresponding one of the inner and outer races.

28. A constant velocity joint according to claim 19, wherein substantially no torque is transmitted via the balls located in the relief groove portions.

29. A constant velocity joint according to claim 19, wherein at least one ball groove of the outer race includes an arcuate groove portion extending along an arc having a center of curvature on the rotational axis of the outer race and a straight groove portion that extends substantially parallel to the direction of the rotational axis of the outer race.

30. A constant velocity joint according to claim 19, wherein at least one ball groove of the inner race includes an arcuate groove portion extending along an arc having a center of curvature on the rotational axis of the inner race and a straight groove portion that extends substantially parallel to the direction of the rotational axis of the inner race.

31. A constant velocity joint according to claim 19, wherein a first ball contact angle of at least one ball groove is set at a predetermined angle over an entire region of a portion of the at least one ball groove other than the relief groove portion of the at least one ball groove.

32. A constant velocity joint according to claim 31, wherein the relief groove portion of the at least one ball groove includes a second ball contact angle that is less than the first ball contact angle.

33. A constant velocity joint according to claim 32, wherein a ball contact angle of the relief groove portion of the at least one ball groove gradually decreases from a first ball contact angle to a second ball contact angle.

34. A constant velocity joint according to claim 19, wherein the ball grooves of the outer race extend from an innermost side of the outer race to an outermost side of the outer race, wherein the innermost side of the outer race corresponds to a position occupied by an innermost one of the plurality of balls when the angle formed by the rotation axis of the inner race and the rotation axis of the outer race is the maximum operating angle of the constant velocity joint, and wherein the outermost side of the outer race corresponds to a position occupied by an outermost one of the plurality of balls when the angle formed by the rotation axis of the inner race and the rotation axis of the outer race is the maximum operating angle of the constant velocity joint.

35. A constant velocity joint according to claim 19, wherein the ball grooves of the outer race extend from an open end portion of the outer race to an inner end portion of the outer race remote from the open end portion.

36. A constant velocity joint according to claim 19, wherein the ball grooves of the inner race only include portions of the inner race in which the plurality of balls travel when the angle formed by the rotation axis of the inner race and the rotation axis of the outer race is less than or equal to the maximum operating angle of the constant velocity joint.

* * * * *